US008031789B2

(12) United States Patent
Ionescu et al.

(10) Patent No.: US 8,031,789 B2
(45) Date of Patent: Oct. 4, 2011

(54) METHODS AND SYSTEMS FOR DIVERSITY COMBINING OF SYNCHRONIZATION STATISTICS IN OFDM SYSTEMS

(75) Inventors: Dumitru Mihai Ionescu, San Diego, CA (US); Abu Amanullah, San Diego, CA (US); Ghobad Heidari-Bateni, San Diego, CA (US)

(73) Assignee: Olympus Corporation, Hachioji-Shi Tokyo (JP)

( * ) Notice: Subject to any disclaimer, the term of this patent is extended or adjusted under 35 U.S.C. 154(b) by 578 days.

(21) Appl. No.: 12/099,017

(22) Filed: Apr. 7, 2008

(65) Prior Publication Data

US 2009/0067532 A1     Mar. 12, 2009

Related U.S. Application Data

(60) Provisional application No. 60/910,635, filed on Apr. 6, 2007, provisional application No. 60/910,639, filed on Apr. 6, 2007, provisional application No. 60/910,641, filed on Apr. 6, 2007.

(51) Int. Cl.
    H04K 1/10 (2006.01)
    H04L 27/28 (2006.01)
(52) U.S. Cl. ........ 375/260; 375/267; 375/347; 375/349; 375/354; 375/356; 455/500; 455/101; 370/206; 370/208
(58) Field of Classification Search .................. 375/260, 375/267, 347, 349, 354, 356, 371, 206, 208; 455/500, 101
    See application file for complete search history.

(56) References Cited

U.S. PATENT DOCUMENTS

| | | |
|---|---|---|
| 6,577,690 B1 | 6/2003 | Barman |
| 6,618,452 B1 | 9/2003 | Huber |
| 6,795,424 B1 | 9/2004 | Kapoor |
| 7,069,577 B2 | 6/2006 | Geile |
| 2002/0105928 A1 | 8/2002 | Kapoor |
| 2003/0099280 A1 | 5/2003 | Kumar |
| 2004/0057374 A1* | 3/2004 | Bott et al. ............... 370/206 |
| 2004/0156441 A1 | 8/2004 | Peeters et al. |
| 2004/0161047 A1 | 8/2004 | Liu |
| 2005/0031016 A1 | 2/2005 | Rosen |
| 2005/0031051 A1 | 2/2005 | Rosen |
| 2005/0041746 A1 | 2/2005 | Rosen |
| 2005/0041752 A1 | 2/2005 | Rosen |
| 2005/0041756 A1 | 2/2005 | Rosen |
| 2005/0041757 A1 | 2/2005 | Rosen |
| 2005/0041758 A1 | 2/2005 | Rosen |

(Continued)

OTHER PUBLICATIONS

P.H. Moose, "A technique for orthogonal frequency division multiplexing frequency offset correction", IEEE Trans. Commun., vol. 47, Nov. 1999, pp. 2908-2914.

(Continued)

*Primary Examiner* — Phuong Phu

(74) *Attorney, Agent, or Firm* — Sheppard Mullin Richter & Hampton LLP

(57) ABSTRACT

Various embodiments of the systems and methods described herein may be used to compute a minimum variance unbiased estimator by receiving a first OFDM signal at a pilot tone, receiving a second OFDM signal sent in the same frequency band and determining a differential phase metric between the first OFDM signal and the second OFDM signal. In some embodiments, the differential phase metric may be used to diversity combine synchronization statistics. In various embodiments, the differential phase metric may be used to detect a narrow-band interference.

20 Claims, 3 Drawing Sheets

U.S. PATENT DOCUMENTS

| | | | |
|---|---|---|---|
| 2005/0041805 A1 | 2/2005 | Rosen | |
| 2005/0053121 A1 | 3/2005 | Lakkis | |
| 2005/0084031 A1 | 4/2005 | Rosen | |
| 2005/0084032 A1 | 4/2005 | Rosen | |
| 2005/0084033 A1 | 4/2005 | Rosen | |
| 2005/0100077 A1 | 5/2005 | Rosen | |
| 2005/0100102 A1 | 5/2005 | Gazdzinski | |
| 2005/0117557 A1 | 6/2005 | Lakkis | |
| 2005/0200076 A1 | 9/2005 | Wu | |
| 2005/0233710 A1 | 10/2005 | Lakkis | |
| 2005/0271175 A1 | 12/2005 | Lashkarian | |
| 2006/0008016 A1 | 1/2006 | Balakrishnan | |
| 2006/0008017 A1 | 1/2006 | Balakrishnan | |
| 2006/0164270 A1 | 7/2006 | Miller | |
| 2006/0166634 A1 | 7/2006 | Ido | |
| 2006/0167784 A1 | 7/2006 | Hoffberg | |
| 2008/0095250 A1* | 4/2008 | Kim et al. | 375/260 |
| 2010/0238787 A1* | 9/2010 | Guey | 370/208 |

OTHER PUBLICATIONS

M. Speth, S.A. Fechtel, G. Fock and H. Meyr, "Optimum receiver design for wireless borad-band systems using OFDM—Part 1", IEEE Trans. Commun. vol. 47, Nov. 1999, pp. 1668-1677.

M. Speth, S.A. Fechtel, G. Fock and H. Meyr, "Optimum receiver design for OFDM-based broad-band transmission—Part II: A case study", IEEE Trans. Commun., vol. 49, Apr. 2001, pp. 571-578.

J. Foerster, "Channel modeling sub-committee report final", Report IEEE P802-15-02/490rl-SG3a, IEEE P802.15 Working Group for Wireless Personal Area Networks, Feb. 7, 2003.

Hirohisa Yamaguchi, Detect-And-Avoid Technology for Ultra Wide-Band Wireless Communication: Figures and Tables:, WiMedia PHY communication.

Search Report from PCT/US2008/059570 mailed Jun. 27, 2008.

Search Report from PCT/US2008/059574 mailed Jun. 27, 2008.

Search Report from PCT/US2008/059572 mailed Jun. 27, 2008.

United States Patent and Trademark Office, First Office Action, U.S. Appl. No. 12/099,013, Issued Dec. 17, 2010.

* cited by examiner

METHODS AND SYSTEMS FOR DIVERSITY COMBINING OF SYNCHRONIZATION STATISTICS IN OFDM SYSTEMS

CROSS-REFERENCE TO RELATED APPLICATIONS

This application claims priority to U.S. Provisional Patent Applications: No. 60/910,635, No. 60/910,639, and 60/910,641, each filed Apr. 6, 2007. The contents, each of which, are incorporated herein by reference in their entirety.

FIELD OF THE INVENTION

The present invention is directed toward methods and systems for diversity combining of synchronization statistics in OFDM systems.

DESCRIPTION OF THE RELATED ART

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, communication networks, both wired and wireless, are now commonplace in many home and office environments. Such networks allow various heretofore independent devices to share data and other information to enhance productivity or simply to improve their convenience to the user. One such communication network that is gaining widespread popularity is an exemplary implementation of a wireless network such as that specified by the WiMedia-MBOA (Multiband OFDM Alliance). Other exemplary networks include the Bluetooth® communications network and various IEEE standards-based networks such as 802.11 and 802.16 communications networks, to name a few.

Such networks have proliferated airports, coffee shops, hotels, offices and other public places. Additionally, wireless networking has become commonplace in the home environment to provide convenience to the user in easily connecting multiple devices. Architects of these and other networks, and indeed communications channels in general, have long struggled with the challenge of managing multiple communications across a limited channel. For example, in some environments, more than one device may share a common carrier channel and thus run the risk of encountering a communication conflict between the one or more devices on the channel. Over the years, network architects have come up with various solutions to arbitrate disputes or otherwise delegate bandwidth among the various communicating devices, or clients, on the network. Schemes used in well known network configurations such as token rings, Ethernet, and other configurations have been developed to allow sharing of the available bandwidth. In addition to these schemes, other techniques have been employed, including for example CDMA (code division multiple access) and TDMA (time division multiple access) for cellular networks.

FDM (Frequency Division Multiplexing) is another technology that enables multiple devices to transmit their signals simultaneously over a communication channel in a wired or wireless setting. The devices' respective signals travel within their designated frequency band (carrier), onto which the data (text, voice, video, or other data) is modulated. With adequate separation in frequency band spacing, multiple devices can simultaneously communicate across the same communication channel (network or point-to-point).

Orthogonal FDM (OFDM) spread spectrum systems distribute the data over a plurality of carriers that are spaced apart at precise frequencies. The spacing is chosen so as to provide orthogonality among the carriers. Thus, a receiver's demodulator recovers the modulated data with little interference from the other carrier signals. The benefits of OFDM are high spectral efficiency, resiliency to RF interference, and lower multi-path distortion or inter symbol interference (ISI). OFDM systems can be combined with other techniques (such as time-division multiplexing) to allow sharing of the individual carriers by multiple devices as well, thus adding another dimension of multiplexing capability.

With the proliferation of the many different wireless systems, interference from, for example, other transmitters may block a desired signal. Additionally, in some cases it can be necessary to estimate carrier or sampling frequency in various communication systems. Various communication systems might also diversity to improve signal reception quality.

In various embodiments, the cumulative effect of CFO and SFO might be compensated for in order to limit or avoid the performance loss. Some implementations treat each OFDM symbol as a separate entity from the perspective of correcting the SFO. These implementations may run a pilot phase tracking algorithm that may be designed to compensate for SFO. The pilot phase trading algorithm may be run anew for every OFDM symbol throughout the entire packet.

In some embodiments, synchronization algorithms might not rely on channel estimation because channel estimators may have inherent errors. This may be especially true if the channel estimators are not too sophisticated. These errors may impair the synchronization algorithms' performance.

In some cases, differential, non-coherent detection may bypass the need for channel state information. Similarly, good carrier frequency-offset estimators might rely on some differential metric in order to not depend on the quality of a channel estimator. It was shown in P. H. Moose, "A technique for orthogonal frequency division multiplexing frequency offset correction," *IEEE Trans. Commun.*, vol. COMM-42, pp. 2908-2914, October 1994, ("Moose") that a maximum likelihood (ML) estimate of the carrier frequency offset (CFO) can be obtained from a differential metric. The Moose article is incorporated herein in its entirety by reference. One limitation of the Moose article is that it does not differentiate between CFO and sampling (clock) frequency offset (SFO); that distinction was made in M. Speth, S. A. Fechtel, G. Fock, and H. Meyr, "Optimum receiver design for wireless broad-band systems using OFDM—Part I," *IEEE Trans. Commun.*, vol. 47, pp. 1668-1677, November 1999, ("Speth Part I"), M. Speth, S. A. Fechtel, G. Fock, and H. Meyr, "Optimum receiver design for OFDM-based broad-band transmission—Part II: A case study," *IEEE Trans. Commun.*, vol. 49, pp. 571-578, April 2001, ("Speth Part II"), which do start from the ML estimate in the Moose article, but the CFO and SFO estimators proposed therein lack optimality. Specifically, they fail to make the connection between sufficient statistics and ML estimators (which are not necessarily sufficient statistics); they also fail to bridge the qualitative gap between sufficient ML estimators (when they exist) and minimum variance unbiased (MVUB) estimators; what is being lost is the opportunity to achieve the Cramer-Rao bound by construction, due to the simple fact that MVUB estimators based on complete, sufficient statistics are unique (this is the Rao-Blackwell theorem) and, thereby, achieve the Cramer-Rao bound. This qualitative refinement is not recognized, discussed or implemented in prior art. Speth Parts I and II are hereby incorporated by reference in their entirety.

Further, the derivations of estimators for CFO and SFO in the Speth Part I and II articles rely heavily on Rayleigh fading channel assumptions, which imply that the fading is flat in the frequency domain; this is apparent, to the careful reader, from Section IV.C.2 in Speth Part I and II articles from the applicability and derivation of eq. (14) in Speth Part I, and from the simulation results presented in FIG. 6 of Speth Part II, which is for a Rayleigh channel. While a Rayleigh fading model is justified in satellite communications channels (negligible excess delay due to propagation through atmosphere), the same is not the case with highly frequency-selective channels, such as terrestrial fading channels and at least some of the indoors channels that model propagation of ultrawide band signals. See J. Foerster, "Channel modeling sub-committee report final," Report IEEE P802.15-02/490r1-SG3a, IEEE P802.15 Working Group for Wireless Personal Area Networks, Feb. 7, 2003, incorporated herein by reference in its entirety. For these scenarios, different frequency offset estimation methods are required, which can cope with a channel's strong frequency selectivity during estimation of the frequency offsets.

Apart from these qualitative distinctions that ultimately do influence their performance, estimators based on differential metrics perform pilot phase tracking differentially, from one OFDM symbol to the next—rather than individually for each OFDM symbol, in isolation from other OFDM symbols; it is this differential feature that correctly and desirably avoids the estimators' dependence on channel state information. The Speth Part I and II articles are incorporated herein in their entirety by reference.

From another perspective, solutions known in the art do not leverage the SFO/CFO correction, or compensation, on a form of diversity or redundancy-primarily because wireless OFDM systems are relatively new, and diversity mechanisms that could be relevant in fading channels to CFO/SFO tracking algorithms were lacking; in particular, in OFDM systems each subcarrier (tone) experiences flat fading, which does not lend itself to diversity mechanisms via signal combining. Moreover, multipath diversity in the time domain, which could be exploited by signal combining, translates into frequency selectivity in the frequency domain, which must be exploited by coding and/or interleaving, rather than by signal combining. In addition, the more recent digital broadcasting systems based on OFDM, as well as MIMO OFDM systems, do not rely on frequency hopping, which constitutes both a form of spectrum spreading and a source of diversity in fading channels. In essence, neither did SFO/CFO schemes known in the art employ any method for exploiting diversity from frequency hopping, nor did they have clear opportunities to do so.

BRIEF SUMMARY OF THE INVENTION

Various embodiments of the systems and methods described herein may be used to compute a minimum variance unbiased estimator by receiving a first OFDM signal at a pilot tone, receiving a second OFDM signal sent in the same frequency band and determining a differential phase metric between the first OFDM signal and the second OFDM signal.

In some embodiments, the differential phase metric may be used to diversity combine synchronization statistics. For example, in some embodiments a diversity system may determine a plurality of diversity observations in a diversity system by calculating a plurality of differential phase metrics at a plurality of pilot tones. The diversity observations may be collected on the same pilot tones during a number of uncorrelated frequency hops and combine.

In various embodiments, the differential phase metric may be used to detect a narrow-band interference. Various embodiments calculate a differential phase metric. The metric can then be compared to a predetermined threshold and the likelihood that a narrowband interferer is present can be determined based on the comparison.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 2, which comprises

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

In various embodiments, systems may be implemented to calculate the differential phase metric at pilot tone k between two consecutive OFDM symbols sent in the same frequency band. This translates into observing, in the frequency domain, at least two consecutive OFDM symbols or as many as the number of active spectral hop bands plus one. In some embodiments, this may be repeated for other pilot tones or all tones that are to be used in estimating the carrier and sampling clock relative frequency offsets. If more than one diversity branch is available, the system may collect diversity observations on the same pilot tones. This can be done during a number of uncorrelated diversity branches, e.g. frequency hops. If more than one diversity branches are available some systems may combine diversity observations of the (sufficient) differential synchronization statistic. Various systems can apply the unique minimum variance unbiased estimator for the carrier and sampling clock relative frequency offsets. In some embodiments a symmetric representation of the frequency domain signal, such as a conjugate symmetric component retrieved from the original observables may be applied to the unique minimum variance unbiased estimator for the carrier and sampling clock relative frequency offsets. Without resorting to a symmetric component such as a conjugate symmetric component retrieved from the original observables the systems and methods described herein may combine the above estimates, for example, by summing them. Additionally they may remove the effect of the wideband signal from the combined estimates based on asymmetric observables. Various embodiments operate on the resulting metric, by comparing it to a selected threshold. This may be performed in order to make the hypotheses that a narrow band interferer is present or absent. In some embodiments, the metric due to a possible narrowband interferer can be processed in order to assess its relative strength with respect to the tolerated wideband device and to avoid or mitigate the narrow band device operating within the band of the tolerated wideband device. In some embodiments, a system may either correct the local oscillator(s) frequency, or form and apply a correction to the demodulated samples (post DFT) based on the estimated synchronization parameters. This can be done in parallel. Additionally, the estimation and detection procedure may be repeated throughout the duration of the packet.

Figure 1:
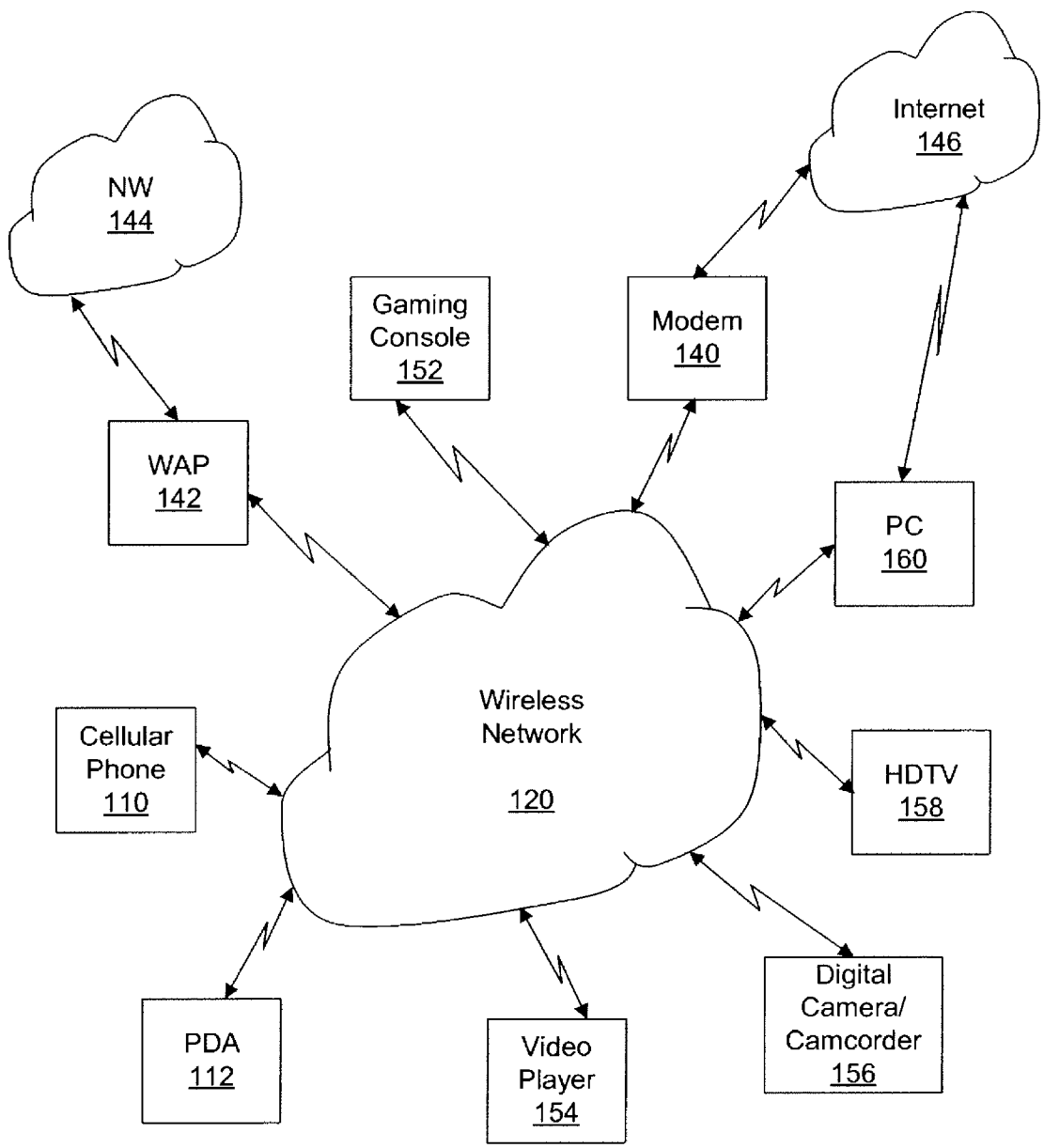
FIG. 1 is a block diagram illustrating one possible configuration of a wireless network that might serve as an example environment in which the present invention can be implemented.

Before describing the invention in detail, it is useful to describe an example environment with which the invention can be implemented. One such example is that of a wireless network. FIG. 1 is a block diagram illustrating one possible configuration of a wireless network that can serve as an example environment in which the present invention can be implemented. Referring now to FIG. 1, a wireless network 120 is provided to allow a plurality of electronic devices to communicate with one another without the need for wires or cables between the devices. A wireless network 120 can vary in coverage area depending on a number of factors or parameters including, for example, the transmit power levels and receive sensitivities of the various electronic devices associated with the network. Examples of wireless networks can include the various IEEE and other standards as described above, as well as other wireless network implementations. Another example of a wireless network is that specified by the WiMedia standard (within the WiMedia and Multi-Band OFDM Alliance). From time-to-time, the present invention is described herein in terms of wireless network. Description in terms of these environments is provided to allow the various features and embodiments of the invention to be portrayed in the context of an exemplary application. After reading this description, it will become apparent to one of ordinary skill in the art how the invention can be implemented in different and alternative environments. Indeed, applicability of the invention is not limited to a wireless network, nor is it limited to a WiMedia standard described as one implementation of the example environment.

With many applications, the wireless network 120 operates in a relatively confined area, such as, for example, a home or an office. The example illustrated in FIG. 1 is an example of an implementation such as that which may be found in a home or small office environment. Of course wireless communication networks and communication networks in general are found in many environments outside the home and office as well. In the example illustrated in FIG. 1, wireless network 120 includes a communication device to allow it to communicate with external networks. More particularly, in the illustrated example, wireless network 120 includes a modem 140 to provide connectivity to an external network such as the Internet 146, and a wireless access point 142 that can provide external connectivity to another network 144.

Also illustrated in the example wireless network 120 are portable electronic devices such as a cellular telephone 110 and a personal digital assistant (PDA) 112. Like the other electronic devices illustrated in FIG. 1, cellular telephone 110 and PDA 112 can communicate with wireless network 120 via the appropriate wireless interface. Additionally, these devices may be configured to further communicate with an external network. For example, cellular telephone 110 is typically configured to communicate with a wide area wireless network by way of a base station.

Additionally, the example environment illustrated in FIG. 1 also includes examples of home entertainment devices connected to wireless network 120. In the illustrated example, electronic devices such as a gaming console 152, a video player 154, a digital camera/camcorder 156, and a high definition television 158 are illustrated as being interconnected via wireless network 120. For example, a digital camera or camcorder 156 can be utilized by a user to capture one or more still picture or motion video images. The captured images can be stored in a local memory or storage device associated with digital camera or camcorder 156 and ultimately communicated to another electronic device via wireless network 120. For example, the user may wish to provide a digital video stream to a high definition television set 158 associated with wireless network 120. As another example, the user may wish to upload one or more images from digital camera 156 to his or her personal computer 160 or to the Internet 146. This can be accomplished by wireless network 120. Of course, wireless network 120 can be utilized to provide data, content, and other information sharing on a peer-to-peer or other basis, as the provided examples serve to illustrate.

Also illustrated is a personal computer 160 or other computing device connected to wireless network 120 via a wireless air interface. As depicted in the illustrated example, personal computer 160 can also provide connectivity to an external network such as the Internet 146.

In the illustrated example, wireless network 120 is implemented to provide wireless connectivity to the various electronic devices associated therewith. Wireless network 120 allows these devices to share data, content, and other information with one another across wireless network 120. Typically, in such an environment, the electronic devices would have the appropriate transmitter, receiver, or transceiver to allow communication via the air interface with other devices associated with wireless network 120. These electronic devices may conform to one or more appropriate wireless standards and, in fact, multiple standards may be in play within a given neighborhood. Electronic devices associated with the network typically also have control logic or modules configured to manage communications across the network and to manage the operational functionality of the electronic device. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network.

Electronic devices operating as a part of wireless network 120 are sometimes referred to herein as network devices, members or member devices of the network or devices associated with the network. In one embodiment, devices that communicate with a given network may be members or merely in communication with the network.

In the WiMedia physical layer standard, as in any OFDM system, it may be necessary to cope with the nonzero sampling frequency offset (SFO). In one embodiment, this can be done either by (1) estimating it (or a parameter intricately connected to it) then correcting the frequency of the local oscillator from which the sampling frequency is derived, or (2) by estimating it and simply compensating for its effect, for example, correcting the subcarrier phases and/or advancing or retracting the current sampling instant. The extent to which this estimation is inaccurate may amount to a performance loss. This can be even more so when the frequency spacing between sub-carriers is very small. In combination with the carrier frequency offset (CFO), SFO leads to performance loss can be due to a rotation of the desired modulated symbols. These symbols may be superimposed on the data tones, and forming the object of detection. Performance loss may also be due to inter-carrier interference also called frequency offset noise.

Synchronization in OFDM systems, in particular, estimating the CFO and SFO may be reduced to estimating a differential phase variation (increment) in the complex domain. Two observations in additive white Gaussian noise (AWGN) are illustration in equation (1).

$$\begin{cases} Y_1 = R_1 + v_1 \\ Y_2 = R_1 \exp(j\theta) + v_2 \end{cases} \quad (1)$$

In equation (1), all quantities except $\theta$ are complex, $j=\sqrt{-1}$, $v_1$, $v_2$ is complex (circular) AWGN with variance $\sigma_N^2$, and $\theta$ is a random phase parameter to be estimated—represents some phase increment of the signal component in the new observation $Y_2$ relative to the signal component $R_1$ in the previous observation $Y_1$. The noise terms verify $$E\{v_{1R}v_{1I}\}=E\{v_{2R}v_{2I}\}=0 \quad (2)$$

$$\mathrm{var}(v_1)=\mathrm{var}(v_2)=\sigma_N^2 \quad (3)$$

$$E\{v_1\}=E\{v_2\}=0 \quad (4)$$

$$E\{v_1R^2\}=E\{v_1I^2\}=E\{v_2R^2\}=E\{v_2I^2\}=\sigma_N^2/2 \quad (5)$$

In OFDM synchronization, the physical meaning of the above model is that the observations $Y_1, Y_2$ represent the complex signal in the frequency domain at a particular subcarrier. This complex signal may be taken during two consecutive OFDM symbols. Additionally, the particular subcarrier may arise as a frequency domain sample of the Fourier transform of the time domain signal, and the sampling effect is implemented via the use of the discrete Fourier transform (DFT).

It will be recognized by one of ordinary skill in the art that not only does this model admit a simple, optimal estimator for the relevant CFO/SFO parameters, but the optimal estimator, which is the unique MVUBE that achieves the Cramer-Rao bound does not rely on, or require, any information about the channel state. Accordingly, any limitations or errors of the channel estimator implemented in the receiver (for use in data detection and decoding) may be transparent to the optimality of the synchronization algorithm.

The well-known isomorphism between a complex number and a real vector in the sequel; e.g., the complex scalar $Y_1$ is isomorphic to the real element two dimensional vector $Y_1$ $$Y_1 = Y_{1R} + jY_{1I} \sim [Y_{1R} \quad Y_{2I}]^T \triangleq Y_1. \quad (6)$$

Similarly for $Y_2$, or other vectors of complex scalars we can let the real column vector $\Xi_2 \triangleq [\Xi_{2R} \ \Xi_{2I}]^T$ represent the product $$Y_1^* Y_2 = (Y_{1R} - jY_{1I})(Y_{2R} + jY_{2I}) \triangleq \Xi_2 \triangleq \Xi_{2R} + j\Xi_{2I} \in \mathbb{C} \quad (7)$$

via the isomorphism $\Xi_{2R}+j\Xi_{2I} \sim \Xi_2$.

The initial complex observations $Y_1, Y_2 \in \mathbb{C}$ form a 4-dimensional statistic $[Y_1^T Y_2^T]$. Because the complexity of the implemented estimator for $\theta$ depends on the dimensionality of the statistic being used, one may question whether there exists another statistic of smaller dimensionality that is sufficient for $\theta$. In other words, another statistic that may replace the original one $[Y_1^T Y_2^T]^T$ with no information about $\theta$ being lost. Likewise, it is worth knowing how much can the sufficient statistic's dimensionality be reduced, i.e. what is the dimension of the minimal sufficient statistic.

Various embodiments may use a statistic of reduced dimensionality. Consider, for example, the random variables transformation from $Y_1, Y_2$ to $Y_1, \Xi_2$:

$$[Y_1^T \Xi_2^T] = \begin{bmatrix} Y_1 \\ \Xi_2 \end{bmatrix}^T \quad (8)$$

$$= [Y_1^T Y_2^T] \begin{bmatrix} I & 0 \\ 0 & W \end{bmatrix}$$

$$\triangleq \hat{w}([Y_1^T Y_2^T])$$

where $$W \triangleq \begin{bmatrix} Y_{1R} & -Y_{1I} \\ Y_{1I} & Y_{1R} \end{bmatrix} \quad (9)$$

Then $$[Y_1^T Y_2^T] = [Y_1^T \Xi_2^T] \begin{bmatrix} I & 0 \\ 0 & W^{-1} \end{bmatrix} \triangleq \hat{w}^{-1}([Y_1^T \Xi_2^T]) \quad (10)$$

The Jacobian of the transformation $\hat{w}^{-1}$ is $$J([Y_1^T \Xi_2^T])=\det(W^{-1})=\det^{-1}(W)=\|Y_1\|^{-2}=J_{\hat{w}^{-1}} \quad (11)$$

and the Jacobian of the transformation $\hat{w}(\bullet)$ is $$J_{\hat{w}}=(Y_{1R}^2+Y_{1I}^2)=\|Y_1\|^2. \quad (12)$$

Then, by the transformation of r.v.s from $Y_1, Y_2$ to $Y_1, \Xi_2$ one finds that the probability density function (pdf) of $Y_1, Y_2$ conditioned on $\theta$ is $$f(Y_1, Y_2|\theta)=f([Y_1^T \Xi_2^T]=\hat{w}([Y_1^T Y_2^T])|\theta)|J_{\hat{w}}|$$

Then $$f(Y_1, Y_2 | \theta) = f(Y_1, \Xi_2 | \theta)\|Y_1\|^2 \quad (13)$$

$$= f(Y_1 | \Xi_2, \theta) f(\Xi_2 | \theta)\|Y_1\|^2$$

$$\overset{(a)}{=} f(Y_1 | \Xi_2) f_\theta(\Xi_2)\|Y_1\|^2$$

$$= f(Y_1 | W^T Y_2)\|Y_1\|^2 f_\theta(\Xi_2)$$

$$\triangleq b(Y_1, Y_2) f_\theta(\Xi_2)$$

where equality (a) follows because $Y_1$ does not depend on $\theta$, and the notation $f(\Xi_2|\theta)=f_\theta(\Xi_2)$ is another notation for the pdf of $\Xi_2$ parameterized by the (deterministic) parameter $\theta$. $f(\Xi_2|\theta)$ is the distribution of the random parameter $\Xi_2$ parameterized by $\theta$ or conditioned on $\theta$, depending on whether $\theta$ is modeled (viewed) as deterministic or random. In the latter case, naturally, $f(\Xi_2|\theta)_{=f(\Xi_2,\theta)}/f(\theta)$.

By the Fisher-Neyman factorization theorem, Proposition 1: $\Xi_2$ is a 2-dimensional statistic of the observations $[Y_1^T Y_2^T]^T$ that is sufficient for the parameter $\theta$.

From this preliminary conclusion it can be shown that the ML estimator derived in the Moose article for $\theta$, based on the differential model (1), can be a function of a sufficient statistic. This will be important when the goal becomes not to find an estimate for $\theta$ per se, but rather a MVUB estimator for a vector of two parameters (CFO and SFO) that together determine the phase increment $\theta$ in OFDM synchronization problems.

A 2-dimensional complete, sufficient statistic from a 2-parameter exponential family Now write $$f(Y_1, \Xi_2 \mid \theta) = f(\Xi_2 \mid Y_1, \theta) f(Y_1 \mid \theta) \qquad (14)$$
$$= f(\Xi_2 \mid Y_1, \theta) f(Y_1)$$

because $Y_1$ does not depend on $\theta$.

To compute $f(v_2 \mid Y_1, \theta)$ note that, conditioned on $Y_1$, the multiplication $Y_1^* Y_2$ is represented in vector form as $$\Xi_2^T = Y_2^T \begin{bmatrix} Y_{1R} & -Y_{1I} \\ Y_{1I} & Y_{1R} \end{bmatrix} \qquad (15)$$

$$= [R_{1R}\cos\theta - R_{1I}\sin\theta + v_{2R} \quad R_{1R}\sin\theta + R_{1I}\cos\theta + v_{2I}] \begin{bmatrix} Y_{1R} & -Y_{1I} \\ Y_{1I} & Y_{1R} \end{bmatrix}$$

$$= \begin{bmatrix} R_{1R}Y_{1R}\cos\theta - R_{1I}Y_{1R}\sin\theta + v_{2R}Y_{1R} + R_{1R}Y_{1I}\sin\theta + R_{1I}Y_{1I}\cos\theta + v_{2I}Y_{1I} - \\ R_{1R}Y_{1I}\cos\theta + R_{1I}Y_{1I}\sin\theta - v_{2R}Y_{1I} + R_{1R}Y_{1R}\sin\theta + R_{1I}Y_{1R}\cos\theta + v_{2I}Y_{1R} \end{bmatrix}^T$$

$$= \begin{bmatrix} \xi_{2R} + \Re(v_2 Y_1^*) \\ \xi_{2I} + \Im(v_2 Y_1^*) \end{bmatrix}^T = \begin{bmatrix} \xi_{2R} + n_{2R} \\ \xi_{2I} + n_{2I} \end{bmatrix}^T$$

where $$n_2 \triangleq v_2 Y_1^* \qquad (16)$$

and, conditioned on $Y_1$, $$E\{n_2\} = 0 \qquad (17)$$

$$E\{n_{2R} n_{2I}\} = E\{(v_{2R}Y_{1R} + v_{2I}Y_{1I})(v_{2I}Y_{1R} - v_{2R}Y_{1I})\} \qquad (18)$$
$$= E\{v_{2R}v_{2I}Y_{1R}^2 - v_{2R}^2 Y_{1R}Y_{1I} + v_{2I}^2 Y_{1R}Y_{1I} - v_{2I}v_{2R}Y_{1I}^2\}$$
$$= 0$$

$$\text{var}(n_2) = |Y_1|^2 \text{var}(v_2) \qquad (19)$$

$$\text{var}(n_{2R}) = \text{var}(n_{2I}) = |Y_1|^2 \text{var}(v_2)/2 \qquad (20)$$

But $$Y_1 Y_1^* = |Y_1|^2 = R_1 Y_1^* + v_1 Y_1^* = (R_{1R}Y_{1R} + R_{1I}Y_{1I}) + j(R_{1I}Y_{1R} - R_{1R}Y_{1I}) + v_1 Y_1^* \qquad (21)$$

and $$\xi_{2R} = (R_{1R}Y_{1R} + R_{1I}Y_{1I})\cos\theta + (R_{1I}Y_{1R} - R_{1R}Y_{1I})\sin\theta \qquad (22)$$
$$= (|Y_1|^2 - \Re(v_1 Y_1^*))\cos\theta + \Im(v_1 Y_1^*)\sin\theta$$
$$= (|Y_1|^2 - n_{1R})\cos\theta + n_{1I}\sin\theta$$

where $$n_1 \triangleq v_1 Y_1^* \qquad (23)$$

and, conditioned on $Y_1$, $$E\{n_1\} = 0 \qquad (24)$$

$$E\{n_{1R}n_{1I}\} = E\{(v_{1R}Y_{1R} + v_{1I}Y_{1I})(v_{1I}Y_{1R} - v_{1R}Y_{1I})\} \qquad (25)$$
$$= E\{v_{1R}v_{1I}Y_{1R}^2 - v_{1R}^2 Y_{1R}Y_{1I} +$$
$$v_{1I}^2 Y_{1R}Y_{1I} - v_{1I} - v_{1R}Y_{1I}^2\}$$
$$= 0$$

$$\text{var}(n_1) = |Y_1|^2 \text{var}(v_1) \qquad (26)$$

$$\text{var}(n_{1R}) = \text{var}(n_{1I}) = |Y_1|^2 \text{var}(v_1)/2 = \text{var}(n_{2R}) = \text{var}(n_{2I}) \qquad (27)$$

$$E\{n_1 n_2^*\} = |Y_1|^2 E\{v_1 v_2^*\} = 0 \qquad (28)$$

Then $$\xi_{2R} = |Y_1|^2 \cos\theta - (N_{1R}\cos\theta - n_{1I}\sin\theta) \qquad (29)$$

and similarly $$\xi_{2I} = (R_{1I}Y_{1R} - R_{1R}Y_{1I})\cos\theta + (R_{1I}Y_{1I} + R_{1R}Y_{1R})\sin\theta \qquad (30)$$
$$= -\Im(v_1 Y_1^*)\cos\theta + (|Y_1|^2 - \Re(v_1 Y_1^*))\sin\theta$$
$$= |Y_1|^2\sin\theta - (n_{1I}\cos\theta + n_{1R}\sin\theta).$$

Thereby $$\Xi_2^T = [\Xi_{2R} \; \Xi_{2I}] \qquad (31)$$
$$= \begin{bmatrix} |Y_1|^2\cos\theta - n_{1R}\cos\theta + n_{1I}\sin\theta + n_{2R} \\ |Y_1|^2\sin\theta - n_{1I}\cos\theta - n_{1R}\sin\theta + n_{2I} \end{bmatrix}^T$$
$$= [|Y_1|^2\cos\theta + \upsilon_{2R} \; |Y_1|^2\sin\theta + \upsilon_{2I}].$$

Also, it can be verified by straightforward calculations that $$E\{\upsilon_{2R}\upsilon_{2I}\} = E\{(-n_{1R}\cos\theta + n_{1I}\sin\theta + n_{2R}) \qquad (32)$$
$$(-n_{1I}\cos\theta - n_{1R}\sin\theta + n_{2I})\}$$
$$= E\{n_{1R}n_{1I}\cos^2\theta + n_{1R}^2\cos\theta\sin\theta - n_{1R}n_{2I}\cos\theta$$
$$- n_{1I}^2\sin\theta\cos\theta - n_{1I}n_{1R}\sin^2\theta + n_{1I}n_{2I}\sin\theta$$
$$- n_{1I}n_{2R}\cos\theta - n_{1R}n_{2R}\sin\theta + n_{2R}n_{2I}\}$$
$$= 0$$

Because $\upsilon_{2R}$, $\upsilon_{2I}$ are uncorrelated and Gaussian, they are independent, too, conditioned on $Y_1$. Further, $$\begin{aligned}\text{var}(\upsilon_{2R}) &= \text{var}(n_{1I})\sin^2\theta + \text{var}(n_{1I})\cos^2\theta + \text{var}(n_{2R}) \\ &= |Y_1|^2\text{var}(v_1)/2 + |Y_1|^2\text{var}(v_2)/2 \\ &= |Y_1|^2\text{var}(v_1)\end{aligned} \quad (33)$$

$$\text{var}(\upsilon_{2I}) = \text{var}(\upsilon_{2R}) = |Y_1|^2\text{var}(v_I) \quad (34)$$

$$\text{var}(\upsilon_2) = 2\text{var}(\upsilon_{2R}) = 2|Y_1|^2\text{var}(v_1) \quad (35)$$

Thereby, $$\begin{aligned}f(\Xi_2 \mid Y_1, \theta) &= \frac{1}{\sqrt{2\pi}\,\sigma_{\upsilon_{2R}}}\exp\left(-\frac{(\Xi_{2R}-|Y_1|^2\cos\theta)^2}{2\sigma_{\upsilon_{2R}}^2}\right) \\ &\quad \frac{1}{\sqrt{2\pi}\,\sigma_{\upsilon_{2R}}}\exp\left(-\frac{(\Xi_{2I}-|Y_1|^2\sin\theta)^2}{2\sigma_{\upsilon_{2I}}^2}\right) = \\ &\frac{1}{2\pi\sigma_{\upsilon_{2R}}\sigma_{\upsilon_{2I}}}\exp\left(-\frac{\Xi_{2R}^2+\Xi_{2I}^2}{\sigma_{\upsilon_2}^2}\right)\exp\left(-\frac{|Y_1|^4\cos^2\theta+|Y_1|^4\sin^2\theta}{\sigma_{\upsilon_2}^2}\right) \\ &\exp\left(\frac{2\Xi_{2R}|Y_1|^2\cos\theta+2\Xi_{2I}|Y_1|^2\sin\theta}{\sigma_{\upsilon_2}^2}\right)=\frac{1}{\pi\sigma_{\upsilon_2}^2}\exp\left(-\frac{\|\Xi_2\|^2}{\sigma_{\upsilon_2}^2}\right) \\ &\exp\left(-\frac{|Y_1|^4}{\sigma_{\upsilon_2}^2}\right)\cdot\exp\left(\frac{2\Xi_{2R}|Y_1|^2\cos\theta}{\sigma_{\upsilon_2}^2}+\frac{2\Xi_{2I}|Y_1|^2\sin\theta}{\sigma_{\upsilon_2}^2}\right)\end{aligned} \quad (36)$$

Because $\|\Xi_2\|^2=\|Y_2\|^2\|Y_1\|^2$, $$\begin{aligned}f(\Xi_2 \mid Y_1, \theta) &= \\ &\frac{1}{\pi 2|Y_1|^2\sigma_{v_1}^2}\exp\left(-\frac{\|Y_2\|^2}{2\sigma_{v_1}^2}\right)\exp\left(-\frac{\|Y_1\|^2}{2\sigma_{v_1}^2}\right)\cdot\exp\left(\frac{\Xi_{2R}\cos\theta}{\sigma_{v_1}^2}+\frac{\Xi_{2I}\sin\theta}{\sigma_{v_1}^2}\right)\end{aligned} \quad (37)$$

Then, from (13) and (14)

$$\begin{aligned}f(Y_1,Y_2 \mid \theta) &= f(\Xi_2 \mid Y_1, \theta)f(Y_1)\|Y_1\|^2 \\ &= \frac{1}{\pi 2\|Y_1\|^2\sigma_{v_1}^2}\exp\left(-\frac{\|Y_2\|^2+\|Y_1\|^2}{2\sigma_{v_1}^2}\right) \\ &\quad \exp\left(\frac{\cos\theta\Xi_{2R}+\sin\theta\Xi_{2I}}{\sigma_{v_1}^2}\right)f(Y_1)\|Y_1\|^2 \\ &= \frac{1}{2\pi\sigma_{v_1}^2}\exp\left(-\frac{\|Y_2\|^2+\|Y_1\|^2}{2\sigma_{v_1}^2}\right)\cdot \\ &\quad \exp\left(\frac{\Xi_{2R}\cos\theta+\Xi_{2I}\sin\theta}{\sigma_{v_1}^2}\right)f(Y_1).\end{aligned} \quad (38)$$

Denoting by $x$ the initial 4-dimensional statistic $x \triangleq [Y_T^1 Y_T^2]$, $f_\theta([Y_1^T Y_2^T]^T)$ has the form $$c(\theta)a(x)\exp\left(\left\{\sum_{i=1}^{2}\pi_i(\theta)t_i(x)\right\}\right)$$

with $\pi_1(\theta)=\cos\theta$, $\pi_2(\theta)=\sin\theta$, $t_1(x)=\Xi_{2R}$, $t_2(x)=\Xi_{2I}$; $f(Y_1 Y_2|\theta)$ belongs thereby to a 2-parameter exponential family and $t(x)=[t_1(x)\ t_2(x)]^T=[\Xi_{2R}\ \Xi_{2I}]^T$ is a 2-dimensional sufficient statistic for $\theta$ that is also complete, and thereby minimal, by virtue of the properties of exponential distribution families. This, along with (32), (31) is summarized in Proposition 2: $\Xi_2$, the 2-dimensional statistic of the observations $[Y_1^T Y_2^T]^T$, is a complete, and thereby minimal, sufficient statistic for the parameter $\theta$ of (1); the two components of the sufficient statistic are affected by independent additive Gaussian noise terms.

Various embodiments can use an alternative expression for the minimal sufficient statistic. For example, an alternative perspective on the expression of the sufficient statistic $[\Xi_{2R}=\Xi_{2I}]^T$ is obtained via $$\begin{aligned}\Xi_{2R}+j\Xi_{2I} &= Y_2 Y_1^* \\ &= (R_1\exp(j\theta)+v_2)(R_1^*+v_1^*) \\ &= |R_1|^2\exp(j\theta)+v_2 R_1^*+R_1\exp(j\theta)v_1^*+v_2 v_1^* \\ &= |R_1|^2\cos\theta+j|R_1|^2\sin\theta+v_{2R}R_{1R}+v_{2I}R_{1I}+ \\ &\quad j(-v_{2R}R_{1I}+v_{2I}R_{1R})+[(R_{1R}\cos\theta-R_{1I}\sin\theta)+ \\ &\quad j(R_{1R}\sin\theta+R_{1I}\cos\theta)](v_{1R}-jv_{1I})+ \\ &\quad (v_{2R}+jv_{2I})(v_{1R}-jv_{1I}) \\ &= |R_1|^2\cos\theta+j|R_1|^2\sin\theta+v_{2R}R_{1R}+v_{2I}R_{1I}+ \\ &\quad j(-v_{2R}R_{1I}+v_{2I}R_{1R})+[(R_{1R}\cos\theta-R_{1I}\sin\theta)v_{1R}+ \\ &\quad (R_{1R}\sin\theta+R_{1I}\cos\theta)v_{1I}]+j[(R_{1R}\sin\theta+R_{1I}\cos\theta) \\ &\quad v_{1R}-(R_{1R}\cos\theta-R_{1I}\sin\theta)v_{1I}]+ \\ &\quad (v_{2R}v_{1R}+v_{2I}v_{1I})+j(v_{2I}v_{1R}-v_{2R}v_{1I})\end{aligned} \quad (39)$$

$$\begin{aligned}\Xi_{2R} &= |R_1|^2\cos\theta+v_{2R}R_{1R}+v_{2I}R_{1I}+[(R_{1R}\cos\theta-R_{1I}\sin\theta)v_{1R}+ \\ &\quad (R_{1R}\sin\theta+R_{1I}\cos\theta)v_{1I}]+\underbrace{v_{2R}v_{1R}+v_{2I}v_{1I}}_{\mu_{2R}''} \\ &= |R_1|^2\cos\theta+\mu_{2R}'+\mu_{2R}'' \\ &\triangleq |R_1|^2\cos\theta+\mu_{2R}\end{aligned} \quad (40)$$

$$\begin{aligned}\Xi_{2I} &= |R_1|^2\sin\theta+(-v_{2R}R_{1I}+v_{2I}R_{1R})+ \\ &\quad [(R_{1R}\sin\theta+R_{1I}\cos\theta)v_{1R}-(R_{1R}\cos\theta-R_{1I}\sin\theta)v_{1I}]+ \\ &\quad \underbrace{v_{2I}v_{1R}-v_{2R}v_{1I}}_{\mu_{2I}''} \\ &= |R_1|^2\sin\theta+\mu_{2I}'+\mu_{2I}''\end{aligned} \quad (41)$$

The correlation between $\mu_{2R}$ and $\mu_{2I}$ may be determined as:

$$\begin{aligned}E\{\mu_{2R}\mu_{2I}\} &= E\{(\mu_{2R}'+\mu_{2R}'')(\mu_{2I}'+\mu_{2I}'')\} \\ &= E\{\mu_{2R}'\mu_{2I}'\}+E\{\mu_{2R}'\mu_{2I}''\}+E\{\mu_{2R}''\mu_{2I}'\}+ \\ &\quad E\{\mu_{2R}''\mu_{2I}''\}\end{aligned} \quad (42)$$

It can be verified by straightforward calculations, albeit cumbersome and lengthy, that each of the terms in (42) vanish and $$E\{2\}R\{L_2\}=0 \quad (43)$$

Therefore, the additive noise terms in the two components of the sufficient statistic for $\theta$ are uncorrelated. However, neither $\mu_{2R}$ nor $\mu_{2I}$ are strictly speaking Gaussian, and without normality (43) does not imply independence of $\mu_{2R}$ from $\mu_{2I}$. Nonetheless, the expressions involving $\Xi_{2R}$ and $\Xi_{2I}$ in the actual estimator(s) will enable the use of the central limit theorem, and will thereby be seen to allow one to separate the averaging operations over expressions containing $\mu_{2R}$ and respectively $\mu_{2I}$.

One embodiment may include an application to CFO and SFO estimation. The sufficient statistic $B_{2R}B_{2I}$ may be used directly to obtain a ML estimate of the phase parameter $\theta$ as in the Moose article, via $\hat{\theta} \triangleq \arctan(\Xi_{2I}/\Xi_{2R})$, where $\hat{\cdot}$ denotes an estimate.

This ML estimate may have several drawbacks. In some embodiments, it may only estimate the differential phase θ. Additionally, it might not readily distinguish between components of θ that depend on other meaningful parameters, such as the carrier and sampling clock frequency offsets relevant to OFDM synchronization. In addition, maximization of the likelihood probability may not minimize the estimator's variance, nor may it guarantee the estimator's performance near the Cramer-Rao bound; among ML estimators some perform better than others in term of estimation error variance. Besides, this estimator is generally not unbiased, as can be seen from Jensen's inequality, and the fact that the tangent function is not linear; depending on the size of arg $(\Xi_{2R}+j\Xi_{2I})$ the expectation of the estimate, $E\{\hat{\theta}\}$, may deviate substantially from θ.

The OFDM synchronization problem seeks to prevent degradation of the SNR seen by the outer receiver due to carrier frequency offset (CFO) and the sampling clock frequency offset (SFO); in OFDM timing and synchronization issues are corrected both before and after DFT. The synchronization problem relevant herein deals with observations in the frequency domain, i.e. post DFT. Specifically of interest will be the post DFT fractional carrier frequency offset and the relative sampling clock frequency offset.

It can be shown that the demodulated signal in the frequency domain, during the l-th OFDM symbol and at the k-th subcarrier, post DFT, and with the appropriate CFO and SFO parameters incorporated in the model, is $$z_{l,k}=\exp(j\pi\phi_k)\exp[j2\pi((lN_s+N_g)/N)\phi_k]\alpha(\phi_k)a_{l,k}H_k+ n_{\Omega;l,k}+n_{l,k} \quad (44)$$

where $N_s \triangleq N+N_g$, N represents the size of the DFT transform, $N_g$ is the number of samples contained in the cyclic prefix (or zero padding interval), $N_s$ represents the number of samples in the extended OFDM symbol, $a_{l,k}$ is the complex symbol on the k-th subcarrier of the l-th OFDM symbol, $H_k$ is the frequency domain channel coefficient associated with the k-th subcarrier, which is distributed as a circularly symmetric Gaussian random variable.

The AWGN noise term $n_{l,k}$ models in the frequency domain the AWGN in the time domain; $n_{\Omega;l,k}$ is the ICI, or frequency offset noise. The factor $\alpha(\phi_k)$ is a notation for a ratio of sine functions, $\sin(\pi\phi_k)/\sin(\pi\phi_k/N)$, which has value N when $\phi_k=0$, and can be approximated by N when $\phi_k$ is very small. When the synchronization actually controls the local oscillators that supply the sampling clock and carrier frequencies, the approximation $\alpha(\phi_k)\approx N$ is very good, and the fact that the phase error $\phi_k\neq 0$ is not quite 0 is practically inconsequential. However, in the case when the Fourier transform size is large, and attempts are not made to control the local oscillators' frequencies—but, rather, the receiver algorithms attempt to simply estimate these offsets and compensate for them—the phase error $\phi_k$ can be large enough, for large k, to cause $\alpha(\phi_k)$ to depart from its desired maximum, N, at the origin. In these cases the CFO and SFO can lead to significant SNR loss.

The differential phase increment can be modeled by the phase $\phi_k$, which is given by:

$$\phi_k=\Delta fT_u+\zeta k \quad (45)$$

where $\Delta_f$ is the carrier frequency offset, $T_u$ is the duration of the proper OFDM symbol (cyclic prefix excluded, i.e. $T_u^{-1}$ is the subcarrier spacing), and $\Delta fT_u$ is the carrier frequency offset normalized to the subcarrier spacing. $\zeta \triangleq (T'-T)/T=(1/T-1/T')1 1/T'$ is the sampling frequency offset normalized to the receiver's sampling clock frequency. The normalized CFO $\Delta fT_u$ is $\Delta f \triangleq \Delta fT_u=n_1+\Delta f_F$ with $\Delta f_F<1$. The integer normalized CFO is manifested in a shift of the frequency domain DFT samples, and is corrected separately from the fractional normalized carrier frequency offset $\Delta f_F$.

In the sequel denote $$n_{\Omega;l,k}+n_{l,k} \triangleq v_{l,k}. \quad (46)$$

The factor $\exp(j\pi\phi_k)$ cannot be distinguished from the channel gain $H_k$, and may thus be (viewed as) incorporated in $H_k$.

The approximations discussed above are largely irrelevant to the problem of estimating the carrier and sampling frequency offsets—because the sufficient statistic is based on a differential metric that only needs to model the phase increment induced by imperfect synchronization from one OFDM symbol to the next. This means that synchronization may remain transparent to knowledge of CSI (via $H_k$). Additionally, because relying on channel estimates would impair synchronization due to inherent channel estimation errors it may be advantageous to synchronize without using such estimator.

The following analysis assumes that either the integer normalized CFO has been corrected post DFT and only the fractional normalized carrier frequency offset $\Delta f_F$ remains to be corrected or that the initial CFO $\Delta f$ is less than the subcarrier spacing $T_u^{-1}$. The latter can be the case, for example, when the Fourier transform size N is small. When the Fourier transform size is small, the intercarrier spacing is larger than twice the tolerance of the frequency reference used by the receiver's local oscillator. Accordingly, the handling of the two components can be separated from each other.

Consider the problem formulated in terms of the above set-up as $$z_{l-1,k}=R_{l-1,k}+v_{l-1,k}$$

$$z_{l,k}=R_{l-1,k}\exp(j\Delta\phi_{k,(l)})+v_{l,k} \quad (47)$$

where $\Delta\phi_{k,(l)}$ is the variation of the k-th subcarrier's phase due to nonzero CFO and SFO, according to (44), (45), over the duration of one OFDM symbol, i.e. from one OFDM symbol to the next; also, $$|R_{l-1,k}|^2=\alpha^2(\phi_k)|a_{l,k}|^2|H_k|^2; \quad (48)$$

if the synchronization limits itself to subcarriers that carry pilot symbols of energy $\beta^2\sigma_a^2$, with $\sigma_a^2$ the energy of the complex constellation used for pilots and $\beta^2>1$ the energy-boost factor for the pilot symbols, then $$|R_{l-1,k}|^2=\alpha^2(\phi_k)\beta^2\sigma_a^2|H_k|^2. \quad (49)$$

This is the same model as the one in (1), used to derive the sufficient statistic; according to above results, a sufficient, complete and minimal statistic for $\Delta\phi_{k,(l)}$ is $$x_{l,k} \triangleq z_{l,k}z_{l-1,k}^*. \quad (50)$$

The only assumption made is the benign assumption that the channel does not change for the duration necessary to compute the differential metric. Let C be the set of indices of the subcarriers that are to be used for CFO and SFO estimation; typically these symbols are pilot symbols, sometimes implemented as continuous or scattered pilots. C is assumed to be symmetric around 0, i.e. if k∈C then −k∈C; it is useful to denote the subset of positive indices in C as $C_+$.

Considering, as discussed above, only the fractional (normalized) carrier frequency offset $\Delta f_F T_u$, the phase variation on subcarriers −k and k, according to (44), (45), over the duration of one OFDM symbol, i.e. from one OFDM symbol to the next (index l incremented only by 1), is $$\Delta\varphi_{\pm k,(1)} = 2\pi((N+N_g)/N)\phi_k \quad (51)$$
$$= 2\pi((N+N_g)/N)(\Delta f_F T_u \pm \zeta k)$$
$$= 2\pi((N+N_g)/N)\Delta f_F T_u \pm 2\pi((N+N_g)/N)\zeta k$$
$$\triangleq \Delta f_F'' \pm \zeta' k.$$

Similarly, the phase variation on subcarriers −k and k, according to (44), (45), over the duration of γ consecutive OFDM symbols is $$\Delta\varphi_{\pm k,(\gamma)} = 2\pi\gamma((N+N_g)/N)\phi_k \quad (52)$$
$$= 2\pi\gamma((N+N_g)/N)(\Delta f_F T_u \pm \zeta k)$$
$$= \gamma\Delta f_F'' \pm \gamma\zeta' k.$$

Considering the result in discussed above, $\Re_{l,k}$, $\Im_{l,k}$, $\Im_{l,-k}$, $\Re_{l,-k}$ form a complete, minimal, sufficient statistic for the parameter vector $$a_k \triangleq [\Delta\varphi_{k,(1)} \ \Delta\varphi_{-k,(1)}]^T, k > 0, \quad (53)$$

In one embodiment conjugate-symmetry reduction of frequency domain observations may be used. It will be useful in some cases to retrieve either the conjugate symmetric or the conjugate anti-symmetric component of the DFT sequences $z_{l-1,k}$ and $z_{l,k}$, which in general do not exhibit conjugate symmetry. The former is accomplished by the simple operation $$z_{CS;l-1,k} \triangleq \frac{1}{2}(z_{l-1,k} + z^*_{l-1,-k}) \quad (54)$$
$$= \frac{1}{2}(R_{l-1,k} + R^*_{l-1,-k}) + \frac{1}{2}(v_{l-1,k} + v^*_{l-1,-k})$$
$$= R_{CS;l-1,k} + v_{CS;l-1,k}$$

where $z_{CS;l-1,k}$, $R_{CS;l-1,k}$, and $v_{CS;l-1,k}$ are the conjugate symmetric components of the sequences $\{z_{CS;l-1,k}\}_{k=0}^{N-1}$ etc. Similarly, using (51), $$z_{CS;l,k} \triangleq \frac{1}{2}(z_{l,k} + z^*_{l,-k}) \quad (55)$$
$$= \frac{1}{2}(R_{l-1,k}\exp(j\Delta\varphi_{k,(1)}) + R^*_{l-1,-k}\exp(-j\Delta\varphi_{-k,(1)})) +$$
$$\frac{1}{2}(v_{l,k} + v^*_{l,-k})$$
$$= \frac{1}{2}(R_{l-1,k}\exp(j\Delta f_F'')\exp(j\zeta'k) + R^*_{l-1,-k}\exp(-j\Delta f_F'')$$
$$\exp(-j(-\zeta'k))) + v_{CS;l,k}$$
$$= \frac{1}{2}(R_{l-1,k}\exp(j\Delta f_F'') + R^*_{l-1,-k}\exp(-j\Delta f_F''))$$
$$\exp(j\zeta'k) + v_{CS;l,k}$$

$$= \frac{1}{2}(R_{l-1,k} + R^*_{l-1,-k}\exp(-j2\Delta f_F''))\exp(j\Delta f_F'')$$
$$\exp(j\zeta'k) + v_{CS;l,k}$$
$$= \frac{1}{2}(R_{l-1,k} + R^*_{l-1,-k}\exp(-j2\Delta f_F''))\exp(j\Delta\varphi_{k,(1)}) +$$
$$v_{CS;l,k}$$
$$\approx \frac{1}{2}(R_{l-1,k} + R^*_{l-1,-k})\exp(j\Delta\varphi_{k,(1)}) + v_{CS;l,k}$$
$$= R_{CS;l-1,k}\exp(j\Delta\varphi_{k,(1)}) + v_{CS;l,k}$$

where the approximation $R_{l-1,-k}^*\exp(-j2\Delta f''_F) \approx R_{l-1,-k}^*$ is justified whenever the fractional (or even total) CFO $\Delta f''_F$ is much smaller than the phases of at least one of the factors of $R_{l-1,-k}^*$. This is de facto the case in all practical implementations; e.g., $R_{l-1,k} = \alpha(\phi_k)a_{l,k}H_k$, where $a_{l,k}$ is a complex symbol, be it pilot or data, from a (possibly finite size) constellation, such as M-QAM; e.g., in the case of 4-QAM, the phase of $a_{l,k}$ is a multiple of $\pi/4 >> \Delta f''_F$ where $\Delta f''_F = 2\pi((N+N_g)/N)\Delta f_F T_u = 2\pi((N+N_g)/N)\Delta f_F$ and $\Delta f_F$ is no larger than 100 ppm (parts per million).

Equations (54), (55) have the same form as (47), and thereby the results apply to $z_{CS;l-1,k}$, $z_{CS;l,k}$ as they did to $z_{l-1,k}$, $z_{l,k}$, with the distinction that $z_{CS;l-1,k}$, $z_{CS;l,k}$ have conjugate symmetry and verify $|z_{CS;l,k}| = |z_{CS;l,-k}|$; note that this operation reduces the noise variance, i.e. $v_{CS;l,k}$ has half the variance of $v_{l,k}$.

When the conjugate symmetry is necessary, $z_{CS;l-1,k}$, $z_{CS;l,k}$ can be used in place of $z_{l-1,k}$, $z_{l,k}$. A similar discussion applies to using the conjugate anti-symmetry component of $z_{l-1,k}$, $z_{l,k}$.

In systems like the ultrawide band (UWB) multiband OFDM frequency hopping is allowed as a form of spectrum spreading, which opens up the possibility of using diversity techniques in synchronization algorithms.

Eqs. (40), (41), (43) can be invoked to justify a diversity method that combines the observations $x_{l,k}$ among all frequency bands used in spectrum hopping during γ consecutive OFDM symbols. In an OFDM system phase variation on subcarrier k must be monitor according to (44) and (45), over the duration of γ consecutive OFDM symbols, γ>1. Let $$\chi_{l,k;\gamma} \triangleq \sum_{i=1}^{\gamma} x_{l,k|i} \quad (56)$$

where $x_{l,k|i}$ is the sufficient statistic obtained while hopping in the i-th hopped band, i=1, ..., γ. With an obvious notation, what is being combined are the magnitudes $|R_{l-1,k|i}|$ per eq. (49). Combining these observations does not change the dimensionality of a sufficient statistic derived from a κ-parameter exponential family. The new statistic is sufficient and complete for $\Delta\phi_{k,(\gamma)}$ of (52), and $$\Re\chi_{l,k;\gamma} = \cos(\Delta\varphi_{k,(\gamma)})\sum_{i=1}^{\gamma}|R_{l-1,k|i}|^2 + \mu_{l,k;\gamma;R} \quad (57)$$

$$\Im\chi_{l,k;\gamma} = \sin(\Delta\varphi_{k,(\gamma)})\sum_{i=1}^{\gamma}|R_{l-1,k|i}|^2 + \mu_{l,k;\gamma;I} \quad (58)$$

or, using (49), $$\Re_{X_{l,k;\gamma}} = \alpha^2(\phi_k)\beta^2\sigma_a^2\left(\sum_{i=1}^{\gamma}|H_{k|i}|^2\right)\cos(\Delta\varphi_{k,(\gamma)}) + \mu_{l,k;\gamma;R}, \quad (59)$$

$$\Im_{X_{l,k;\gamma}} = \alpha^2(\phi_k)\beta^2\sigma_a^2\left(\sum_{i=1}^{\gamma}|H_{k|i}|^2\right)\sin(\Delta\varphi_{k,(\gamma)}) + \mu_{l,k;\gamma;I}, \quad (60)$$

and the diversity combined statistic $[\Re_{l,k;\gamma} \Im X_{l,k;\gamma}]^T$ is a two-dimensional sufficient statistic for $\Delta\phi_{k,(\gamma)} = \gamma\Delta f''_F \pm \gamma\zeta'k$, see (52), which is also complete and minimal per reasoning detailed above.

Any estimators based on $x_{l,k}$ can be used on the diversity combined statistic $[\Re_{l,k;\gamma} \Im X_{l,k;\gamma}]^T$, with the advantage given by diversity. Note that the diversity-combining-induced-summation of the noise terms in the observations $x_{l,k}$ do enable the applicability of the central limit theorem to infer that the sufficient statistic is Gaussian. The applicability of the CLT is mirrored in the use of an unbiased estimator for both $\zeta$ and $\Delta f_F T_u$, which serves as the starting point in the derivation of their, respectively unique, MVUBEs; the applicability of the CLT is due to a similar addition of noise terms inherent in the form of the unbiased estimators that lead to the MVUBEs.

In effect, the diversity combined statistic $[\Re_{l,k;\gamma} \Im X_{l,k;\gamma}]$ lends itself very well to computing MVUBEs for both $\zeta$ and $\Delta f_F T_u$. In some embodiments, the expectation operation averages out additive noise.

In some embodiments, an MVUB estimator for CFO and SFO can be used. Consider the scalar function of $a_k$, $$b(a_k) \triangleq \tan\left[\frac{1}{2}(\Delta\varphi_{k,(1)} - \Delta\varphi_{-k,(1)})\right] = \tan(\zeta''k). \quad (61)$$

Consider the estimate $$\widehat{b(a_k)} \triangleq \frac{\Im x_{l,k} - \Im x_{l,-k}}{\Re x_{l,k} + \Re x_{l,-k}}. \quad (62)$$

By (32), averaging the ratio of differences between homologous components of the sufficient statistics for subcarriers $k$, $-k$, can be done by averaging the numerator and denominator separately; via (31), and whenever the magnitude of the Fourier transform is the same at symmetric (around zero) frequencies, i.e. $|z_{l,k}| = |z_{l,-k}|$, $$E\{\widehat{b(a_k)}\} = \frac{|z_{l,k}|^2\sin(\Delta f''_F + \zeta'k) - |z_{l,-k}|^2\sin(\Delta f''_F - \zeta'k)}{|z_{l,k}|^2\cos(\Delta f''_F + \zeta'k) + |z_{l,-k}|^2\cos(\Delta f''_F - \zeta'k)} \quad (63)$$

$$= \tan(\zeta''k)$$

where the trigonometric identity $$(\sin\alpha - \sin\beta)/(\cos\alpha + \cos\beta) = \tan\left(\frac{1}{2}(\alpha - \beta)\right)$$

was used. Clearly, $\widehat{b(a_k)}$ is unbiased.

A symmetric magnitude of the Fourier transform is encountered in cases when, for example, the time domain signal corresponding to the frequency domain signal $z_{l,k}$ is real. A symmetric magnitude of the Fourier transform may also be encountered when $z_{l,k}$ represents the conjugate symmetric component of a signal, or when $z_{l,k}$ reflects a diversity combining operation whereby the symmetry occurs because of a superposition of several uncorrelated quantities. These examples are not intended to be exhaustive.

From the multiple angle formula $$\tan(nx) = \frac{\tan((n-1)x)\tan x}{1 - \tan((n-1)x)\tan x},$$

it is clear by induction that if $\tan((n-1)x) \approx (n-1)\tan x$ then $\tan(nx) \approx n \tan x$—as long as $n$, $x$ are not large enough that $(n-1)\tan^2 x$ becomes comparable with 1. The relative error in approximating $\tan(nx) \approx n \tan x$ is plotted in double logarithmic scale for $10^{-6} \leq \zeta' \leq 10^{-4}$, with several values for $n$ as a parameter. It is clear that for a significant practical range for $\zeta'$, $n$, the approximation $\tan(nx) \approx n \tan x$ holds very well.

Consider the new scalar function of $a_k$ $$B(a_k) \triangleq \frac{1}{k}b(a_k) \quad (64)$$

$$= \frac{1}{k}\tan\left[\frac{1}{2}(\Delta\varphi_{k,(1)} - \Delta\varphi_{-k,(1)})\right]$$

$$= \tan(\zeta''k)/k$$

$$= \tan\zeta''$$

1. and the estimate $$\widehat{B(a_k)} = \widehat{b(a_k)}/k \triangleq \frac{1}{k}\frac{\Im x_{l,k} - \Im x_{l,-k}}{\Re x_{l,k} + \Re x_{l,-k}} \quad (65)$$

For which the mean is $E\{\widehat{B(a_k)}\} = \tan\zeta'$, making $\widehat{B(a_k)}$ an unbiased estimator for $\tan\zeta'$.

The set of pilot indices $C$ provides a set of $|C|/2$ unbiased estimates for $\tan\zeta'$, based on the complete and minimal sufficient statistics $x_{l,k}$, $k \in C$; $|C|$ denotes the cardinality of $C$. By the Rao-Blackwell theorem, averaging the $|C|/2$ unbiased estimates for $\tan\zeta'$ leads to a minimum variance unbiased estimator (MVUBE) for $\tan\zeta'$, which is unique because the sufficient statistic is complete. It is unique because there is one and only one function of a complete (thus minimal) sufficient statistic that is unbiased. Because it is unique, the MVUBE does achieve the Cramer-Rao bound. This means that all other estimators of $\tan\zeta'$ (or $\zeta'$, e.g. eq. (14) of Speth Part II) are not optimal, in the sense that they are not uniformly better than all other estimators (i.e., they are not MVUBEs).

The MVUBE for $\tan\zeta'$ is $$E\{\widehat{B(a_k)} | x_{l,k}, k \in C\} \triangleq \widehat{\tan\zeta'} = \frac{2}{|C|}\sum_{k \in C_+}\frac{1}{k}\frac{\Im x_{l,k} - \Im x_{l,-k}}{\Re x_{l,k} + \Re x_{l,-k}} \quad (66)$$

Note that it is the estimator for $\tan\zeta'$ that is unbiased, rather than the estimator for $\zeta'$ itself, in general, the ML estimator $\widehat{\zeta'} \triangleq \arctan(E\{\widehat{B(a_k)}|x_{l,k}k \in C\})$ is biased (apply Jensen's inequality). However, whenever $\zeta' < 0.5$, and certainly in the range $\zeta' \in [10^{-5}, 10^{-4}]$, which is representative of most practical applications of OFDM, $$\tan\zeta' \approx \zeta' \quad (67)$$

And thereby the MVUBE for $\zeta'$ is $$\hat{\zeta}'_{MVUB} = \frac{2}{|C|} \sum_{k \in C_+} \frac{1}{k} \frac{\Im x_{l,k} - \Im x_{l,-k}}{\Re x_{l,k} + \Re x_{l,-k}} \quad (68)$$

Naturally, the MVUBE for $\zeta$ is $$\hat{\zeta}_{MVUB} = \frac{1}{\pi(1 + N_g/N)|C|} \sum_{k \in C_+} \frac{1}{k} \frac{\Im x_{l,k} - \Im x_{l,-k}}{\Re x_{l,k} + \Re x_{l,-k}} \quad (69)$$

One can contrast the MVUBE for $\zeta$ given in (69) with the estimator given in eq. (14) of Speth Part II. Because there is one and only one function of a complete (thus minimal) sufficient statistic that is unbiased, all estimators different from (69) are not optimal; that is, they are not uniformly better than all other estimators, i.e., they are not MVUBEs. Note that this does not prevent the expectation of the unbiased estimator for $\Delta\phi_{\pm k,(1)}$ of (51) (rather than $\zeta$, or $\Delta f$) from being a MVUBE, per Rao-Blackwell's theorem. In fact, the above derivations show that the Moose article did implement the average of an unbiased estimator of $\theta$ from (1) (see the Appendix in the Moose article), thereby in effect working with a MVUBE; what was not obvious was to correctly identify a MVUBE for $\zeta'$ and $\Delta f''_F$.

Having provided a MVUBE for $\zeta'$, a similar reasoning leads to a MVUBE for $\Delta f''_F$. Consider the scalar function of $a_k$ $$c(a_k) \triangleq \tan\left[\frac{1}{2}(\Delta\varphi_{k,(1)} + \Delta\varphi_{-k,(1)})\right] = \tan(\Delta f''_F) \quad (70)$$

and the estimate $$\widehat{c(a_k)} \triangleq \frac{\Im x_{l,k} + \Im x_{l,-k}}{\Re x_{l,k} + \Re x_{l,-k}} \quad (71)$$

As before, (32) shows that averaging the ratio of differences between homologous components of the sufficient statistics for subcarriers $k$, $-k$, can be done by averaging the numerator and denominator separately; via (31), and because the magnitude of the Fourier transform is the same at symmetric (around zero) frequencies, i.e. $|z_{l,k}| = |z_{l,-k}|$, $$E\{\widehat{c(a_k)}\} = \frac{|z_{l,k}|^2 \sin(\Delta f''_F + \zeta'k) + |z_{l,-k}|^2 \sin(\Delta f''_F - \zeta'k)}{|z_{l,k}|^2 \cos(\Delta f''_F + \zeta'k) + |z_{l,-k}|^2 \cos(\Delta f''_F - \zeta'k)} \quad (72)$$

$$= \tan(\Delta f''_F)$$

where the trigonometric identity $$(\sin\alpha + \sin\beta)/(\cos\alpha + \cos\beta) = \tan\left(\frac{1}{2}(\alpha + \beta)\right)$$

was used. Clearly, $\widehat{c(a_k)}$ is unbiased and based on a sufficient statistic. By the Rao-Blackwell theorem, averaging the $|C|/2$ unbiased estimates for $\tan(\Delta f''_F)$ leads to a minimum variance unbiased estimator (MVUBE) for $\tan \Delta f''_F$, which is unique because the sufficient statistic is complete. Because it is unique, the MVUBE does achieve the Cramer-Rao bound. The MVUBE for $\tan \Delta f''_F$ is $$E\{\widehat{c(a_k)} \mid x_{l,k}, k \in C\} \triangleq \widehat{\tan \Delta f''_F} \quad (73)$$

$$= \frac{2}{|C|} \sum_{k \in C_+} \frac{\Im x_{l,k} - \Im x_{l,-k}}{\Re x_{l,k} + \Re x_{l,-k}}$$

As before, via $\tan \Delta f''_F \approx \Delta f''_F$, the MVUBE for $\Delta f''_F$ is $$\widehat{\Delta f''_F}^{MVUB} = \widehat{\Delta f'_u T_u}^{MVUB} = \frac{1}{\pi(1 + N_g/N)|C|} \sum_{k \in C_+} \frac{\Im x_{l,k} + \Im x_{l,-k}}{\Re x_{l,k} + \Re x_{l,-k}} \quad (74)$$

Again, the MVUBE for $\Delta f''_F$ given in (74) is clearly distinct from the estimator given in eq. (14) of Speth Part II. It is stressed again that the MVUBEs derived above for both $\zeta$ and $\Delta f_F T_u$ are novel, and need not rely on the channel estimator—which has inherent errors and could irreversibly degrade the performance of a synchronization algorithm that needs channel estimates.

When correctly implemented, the expectation operation averages out the additive noise, including the ICI term $n\Omega; l, k$ (or frequency offset noise, as ICI is called in Speth Part I), which degrades the SNR. In addition, combining the pilot observables, when possible, can further reduce the SNR degradation.

The above steps do not exhaust the ways for implementing this method, or a related apparatus; for example one can add, remove, or modify steps. In one alternate embodiment a step might be added to retrieve a conjugate symmetric component, or a conjugate asymmetric component of the observations or their corresponding statistic, or metric. In another embodiment the estimates might be performed before combining the relevant statistics or metrics, as for example in diversity combining, and the estimates combined thereafter. Or, the estimators in (72), (63) might be modified to account for the case when $|z_{l,k}| \neq |z_{l,-k}|$. Or one can modify the differential metric or use an approximation thereof.

Combining operation may, in some embodiments, average out the additive noise terms, including the ICI term $n_{\Omega; l, k}$ (or frequency offset noise, as ICI is sometimes called, e.g. in Speth, Part I), which degrades the SNR. Therefore, combining the pilot observables can reduce the SNR degradation due to imperfect carrier frequency synchronization.

In the case when a narrow-band in-band interferer is active within the band of a tolerated (unlicensed) wideband or ultra-wide band OFDM device, e.g. a UWB device, it might be necessary or desirable to detect such a narrow band device, referred to as a victim device, in order to protect it by avoiding operation in a band that overlaps the band of the narrow band victim device. The OFDM feature of the tolerated device allows for mitigation techniques such as tone nulling, in addition to simply avoiding the band of the narrow band victim device. One example is a UWB device that must detect a WiMax device, and perform avoidance or mitigation techniques after having detected such a narrow band device. Another example is military radar operating within the band of a UWB device. These examples are not exhaustive as practical embodiments of the ideas described below. While in the case of the WiMax device its carrier frequency and operation band is known a priori (relative to the band of the UWB device), the method described below does not assume this type of side information.

Desirably, detection of a narrow band interferer, especially when its exact spectral position is not known a priori, must exploit the structure present in the tolerated device, monitor its whole bandwidth for energy, rely on modules and functions already present in the tolerated device, and account for any symmetries of the tolerated device or asymmetries of the victim device.

One embodiment that relies on signals and metrics associated with the synchronization of the OFDM tolerated device attempts to detect asymmetries in the magnitude spectrum of the signal observed by the tolerated device, via DFT at the receiver and subcarriers (tones) signals, and discern whether the asymmetric pattern is due to an interferer as opposed to frequency selectivity. Due to the fact that the DFT is simply a sampling of the continuous time spectrum, and the sample positions are the discrete frequencies used by the DFT of the OFDM wideband device, the narrow band signal is seen as another sinusoid, or two sinusoids. This may be the case, if, for example, victim is also OFDM and its discrete frequency bins do not correspond exactly to those of the tolerated wideband OFDM device, superimposed on the discrete frequency domain sample of the tolerated wideband OFDM device. The analysis does not change significantly, as a person of ordinary skill in the art can recognize.

In some embodiments, the venue is offered by a estimator where the assumption $|z_{l,k}|=|z_{l,-k}|$ is purposely not made at one stage of the method and algorithm. Specifically, the estimator is computed without assuming that $|z_{l,k}|=|z_{l,-k}|$, or trying to retrieve a conjugate symmetric component; let $x_0 \triangleq \arctan(|Z_{l,k}|^2/|Z_{l,-k}|^2) \in [0, \pi/2]$, i.e. $|Z_{l,k}|^2/|Z_{l,-k}|^2 \triangleq \tan x_0 = \sin x_0 / \cos x_0$. Clearly the case $|z_{l,k}|=|z_{l,-k}|$ corresponds to $x_0 = \pi/4$. In this case, it can be shown, after some trigonometric and algebraic manipulations, an estimator verifies that:

$$E\{\widetilde{s(a_k)}\} = \frac{|z_{l,k}|^2 \sin(\Delta f''_F + \zeta' k) - |z_{l,-k}|^2 \sin(\Delta f''_F - \zeta' k)}{|z_{l,k}|^2 \cos(\Delta f''_F + \zeta' k) + |z_{l,-k}|^2 \cos(\Delta f''_F - \zeta' k)}$$

$$= \frac{\sin(\Delta f''_F + \zeta' k) - (|z_{l,-k}|^2/|z_{l,k}|^2) \sin(\Delta f''_F - \zeta' k)}{\cos(\Delta f''_F + \zeta' k) + (|z_{l,-k}|^2/|z_{l,k}|^2) \cos(\Delta f''_F - \zeta' k)}$$

$$= \frac{\sin(\Delta f''_F + \zeta' k) - (\sin x_0 / \cos x_0) \sin(\Delta f''_F - \zeta' k)}{\cos(\Delta f''_F + \zeta' k) + (\sin x_0 / \cos x_0) \cos(\Delta f''_F - \zeta' k)}$$

$$= \frac{-\tan \Delta f'' \tan(x_0 - \pi/4) + \tan \zeta' k}{1 + \tan \Delta f'' \tan(x_0 - \pi/4) \tan \zeta' k}$$

$$\approx -\tan \Delta f'' \tan(x_0 - \pi/4) + \tan \zeta' k$$

where the approximation is justified because a product of incremental factors is much smaller than any of the factors and than 1. Note that this expression becomes tan ζ'k, as in (63), when $x_0 = \pi/4$.

Likewise, when $|z_{l,k}|=|z_{l,-k}|$ is not assumed, an estimator can be shown to verify, after some trigonometric and algebraic manipulations, $$E\{\widetilde{c(a_k)}\} = \frac{|z_{l,k}|^2 \sin(\Delta f''_F + \zeta' k) + |z_{l,-k}|^2 \sin(\Delta f''_F - \zeta' k)}{|z_{l,k}|^2 \cos(\Delta f''_F + \zeta' k) + |z_{l,-k}|^2 \cos(\Delta f''_F - \zeta' k)}$$

$$= \frac{\sin(\Delta f''_F + \zeta' k) + (|z_{l,-k}|^2/|z_{l,k}|^2) \sin(\Delta f''_F - \zeta' k)}{\cos(\Delta f''_F + \zeta' k) + (|z_{l,-k}|^2/|z_{l,k}|^2) \cos(\Delta f''_F - \zeta' k)}$$

-continued $$= \frac{\sin(\Delta f''_F + \zeta' k) + (\sin x_0 / \cos x_0) \sin(\Delta f''_F - \zeta' k)}{\cos(\Delta f''_F + \zeta' k) + (\sin x_0 / \cos x_0) \cos(\Delta f''_F - \zeta' k)}$$

$$= \frac{\tan \Delta f'' - \tan \zeta' k \tan(x_0 - \pi/4)}{1 + \tan \Delta f'' \tan(x_0 - \pi/4) \tan \zeta' k}$$

$$\approx \tan \Delta f'' - \tan \zeta' k \tan(x_0 - \pi/4)$$

and the sum of (75), (76) is the mean of the summed estimators $$E\{\widetilde{c(a_k)} + \widetilde{b(a_k)}\} = (\tan \Delta f'' + \tan \zeta' k)(1 - \tan(x_0 - \pi/4))$$

$$= (\tan \Delta f'' + k \tan \zeta')(1 - \tan(x_0 - \pi/4))$$

Thereby, at each subcarrier k, the linear dependence tan Δf"+k tan ζ' determined as a result of synchronization based on a conjugate symmetric set of frequency observations (see Section [0075]) is altered by the factor $1-\tan(x_0-\pi/4)$—which, because $\tan(x_0-\pi/4) \in [-1, 1]$, takes values 0 when $|z_{l,k}| \ll |z_{l,-k}|$, 2 when $|z_{l,k}| \gg |z_{l,-k}|$, and 1 when $|z_{l,k}|=|z_{l,-k}|$ (absent interferer with conjugate symmetric frequency domain observations).

Note that $x_0$ contains information about the relative energy imbalance on tone k; the sum of the two estimators possibly with further approximations and simplifications, and possibly after removing the factor tan Δf"+k tan ζ' due only to the tolerated wideband device—can be compared with an appropriately selected threshold to discern whether the asymmetric pattern is due to an interferer as opposed to frequency selectivity.

Further processing can be aimed at mapping $1-\tan(x_0-\pi/4)$ to the relative strength of the positive tone k vs. the negative tone −k.

It is this structure that can be exploited to obtain indications about the presence of a narrowband interferer, and its strength relative to the UWB device.

The frequency selective fading affecting the tones in the UWB, including a model for correlation due to finite excess delay in the time domain, can be modeled with a pdf, and a threshold selected that guarantees desired probabilities of false alarm and detection.

Figure 2A:
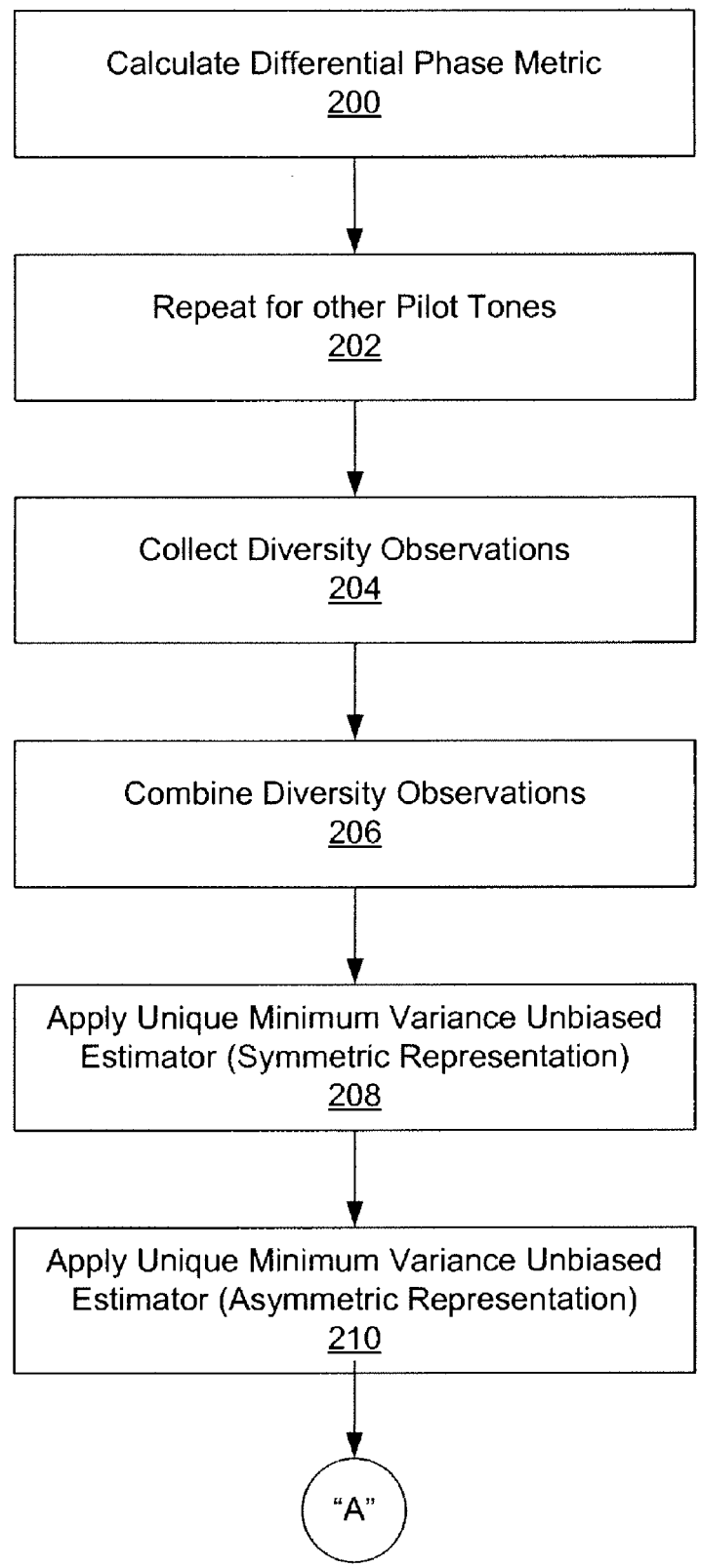
FIG. 2A and FIG. 2B, is a flowchart illustrating an example system in accordance with the systems and methods described herein.
Figure 2B:
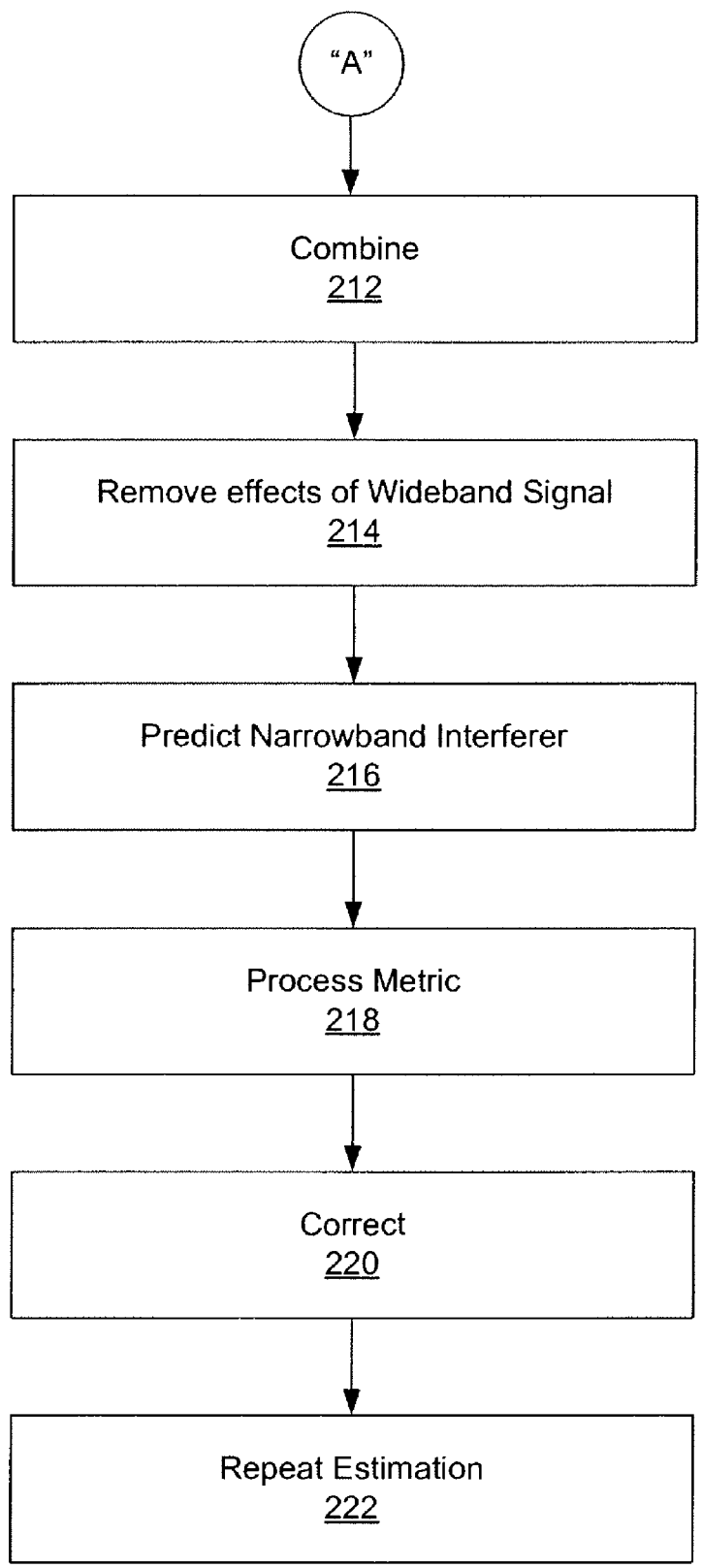

FIG. 2, which comprises FIG. 2A and FIG. 2B is a flowchart illustrating an example system in accordance with the systems and methods described herein. Referring now to FIG. 2A, in a step 200 a differential phase metric is calculated. In some embodiments, the differential phase metric may be calculated at pilot tone k between two consecutive OFDM symbols sent in the same frequency band; naturally, this translates into observing, in the frequency domain, at least two consecutive OFDM symbols, or as many as the number of active spectral hop bands plus one.

In a step 202, the calculation is repeated for other pilot tones, or all tones that are to be used in estimating the carrier and sampling clock relative frequency offsets. In some embodiments, for example, in a diversity based system, this may be done for all subcarriers that are to be used in estimating the carrier and sampling clock relative frequency offsets. Additionally, in a step 204, if more than one diversity branches are available, collect diversity observations on the same pilot tones, during a number of uncorrelated diversity branches, e.g. frequency hops. Further, in systems with more than one diversity branches diversity observations of the (sufficient) differential synchronization statistic are combined in a step 206.

In a step 208, an estimator is used. The unique minimum variance unbiased estimator for the carrier and sampling clock relative frequency offsets is applied, as described above or with reasonable simplifications. Some embodiments may work with a symmetric representation of the frequency domain signal, such as a conjugate symmetric component retrieved from the original observables. In some embodiments, the systems and methods described herein may process a symmetric representation of a frequency domain signal, such as a CS component retrieved from original observables. In various embodiments, a valid estimator for the carrier and sampling clock relative frequency offsets may be used.

In a step 210, other embodiments apply the unique minimum variance unbiased estimator without resorting to a symmetric component such as a conjugate symmetric component retrieved from the original observables.

Continuing with FIG. 2B, in a step 212 estimates are combine. The estimates may be combined, for example, by summing them. Additionally, in a step 214, some embodiments may remove the effect of the wideband signal from the combined estimates based on asymmetric observables. In a step 216 the systems and methods described herein predict a narrowband interferer. For example, some embodiments operate on the resulting metric, in one embodiment by comparing it to a selected threshold, in order to make the hypotheses that a narrow band interferer is present or absent.

In a step 218, various embodiments process the metric due to a possible narrowband interferer in order to assess its relative strength with respect to the tolerated wideband device, and to avoid or mitigate the narrow band device operating within the band of the tolerated wideband device.

In a step 220, various embodiments correct the local oscillator frequency. For example, the systems and methods may correct the local oscillator(s) frequency, or form and apply a correction to the demodulated samples (post DFT) based on the estimated synchronization parameters. This correction may be done in parallel in some embodiments.

In some embodiments, the estimation may be repeated. Additionally, in some embodiments a detection can be repeated. For example, in a step 222 the estimation and detection procedure may be repeated throughout the duration of the packet.

The above steps do not exhaust the ways for implementing this method, or a related apparatus; for example one can add, remove, or modify steps. In one alternate embodiment a step might be added to retrieve a conjugate symmetric component, or a conjugate asymmetric component of the observations or their corresponding statistic, or metric. In another embodiment the estimates might be performed before combining the relevant statistics or metrics, as for example in diversity combining, and the estimates combined thereafter. Or, the estimators in (72), (63) might be modified to account for the case when $|z_{l,k}| \neq |z_{l,-k}|$. Or one can modify the differential metric or use an approximation thereof.

An additional and important benefit is that the combining operation can average out the additive noise terms, including the ICI term $n_{\Omega;l,k}$ (or frequency offset noise, as ICI is sometimes called, e.g. in [0011]), which degrades the SNR. Therefore, combining the pilot observables can reduce the SNR degradation due to imperfect carrier frequency synchronization.

The systems and methods described herein may be implemented using a computer. In one embodiment the computer may be a desktop, laptop, or notebook computer. In another embodiment the computer may be a mainframe, supercomputer or workstation. In yet another embodiment the computer may be a hand-held computing device such as a PDA, smart phone, cell phone 718, palmtop, etc. The computer may also represent computing capabilities embedded within or otherwise available to a given device.

The computer may include one or more processors, which may be microprocessors, microcontrollers, or other control logic and memory, such as random access memory ("RAM"), read only memory ("ROM") or other storage device for storing information and instructions for the processor. Other information storage mechanisms may also be connected to the computer, such as a hard disk drive, a floppy disk drive, a magnetic tape drive, an optical disk drive, a CD or DVD drive (R or RW), or other removable or fixed media drive, such as a program cartridge and cartridge interface, a removable memory (for example, a flash memory or other removable memory module) and memory slot, a PCMCIA slot and card, and other fixed or removable storage units and interfaces that allow software and data to be transferred from the storage unit to the computer.

The computer may also include a communications interface that may be used to allow software and data to be transferred between the computer and external devices. Examples of the communications interface may include a modem or softmodem, a network interface (such as an Ethernet, network interface card, or other interface), a communications port (such as for example, a USB port, IR port, RS232 port or other port), or other wired or wireless communications interface. Software and data transferred via the communications interface are carried on signals, which may be electronic, electromagnetic, optical or other signals capable of being received by a given communications interface. The signals may be provided to the communications interface using a wired or wireless medium. Some examples of a channel may include a phone line, a cellular phone link, an RF link, an optical link, a network interface, a local or wide area network, the internet, and other communications channels.

In this document, the terms "computer program medium" and "computer usable medium" are used to generally refer to media such as, for example, the memory, storage unit, media, and signals on a channel. These and other various forms of computer usable media may be involved in carrying one or more sequences of one or more instructions to the processor for execution. Such instructions, generally referred to as "computer program code" (which may be grouped in the form of computer programs or other groupings), when executed, enable the computer to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

What is claimed is:

1. A method of diversity combining of synchronization statistics comprising:
    determining a plurality of diversity observations in a diversity system by calculating a plurality of differential phase metrics at a plurality of pilot tones, the differential phase metric calculated by:
    receiving a first OFDM signal at a pilot tone;
    receiving a second OFDM signal sent in the same frequency band; and
    determining a differential phase metric between the first OFDM signal and the second OFDM signal;
    collecting diversity observations on the same pilot tones during a number of uncorrelated frequency hops; and
    combining the diversity observations.

2. The method of claim 1, further comprising collecting diversity observations on the same pilot tones.

3. The method of claim 2, wherein the collecting diversity observations on the same pilot tones occurs during a number of uncorrelated diversity branches.

4. The method of claim 3, wherein the uncorrelated diversity branches comprise a number of frequency hops.

5. The method of claim 1, further comprising combining diversity observations of a differential synchronization statistic.

6. The method of claim 1, wherein the steps are repeated during a packet.

7. The method of claim 1, further comprising correcting a local oscillator's frequency based on estimated synchronization parameters.

8. The method of claim 1, further comprising correcting demodulated samples based on estimated synchronization parameters.

9. The method of claim 1, further comprising combining signal estimates based on asymmetric observables.

10. The method of claim 1, further comprising repeating the steps at all pilot tones used to estimate the carrier and sampling clock frequency.

11. A system for diversity combining of synchronization statistics comprising:
    a first antenna;
    a second antenna;
    a processor, coupled to the antennas; and a memory, coupled to the processor and configured to store instructions causing the processor to:
   determine a plurality of diversity observations in a diversity system by calculating a plurality of differential phase metrics at a plurality of pilot tones, the differential phase metric calculated by:
      receive a first OFDM signal at a pilot tone;
      receiving a second OFDM signal sent in the same frequency band; and
      determining a differential phase metric between the first OFDM signal and the second OFDM signal; and
   collect diversity observations on the same pilot tones during a number of uncorrelated frequency hops; and combining the diversity observations.

12. The system of claim 11, wherein the instructions are further configured to cause the processor to collect diversity observations on the same pilot tones.

13. The system of claim 12, wherein the instructions are further configured to cause the processor to collect diversity observations on the same pilot tones occurs during a number of uncorrelated diversity branches.

14. The system of claim 13, wherein the uncorrelated diversity branches comprise a number of frequency hops.

15. The system of claim 11, wherein the instructions are further configured to cause the processor to combine diversity observations of a differential synchronization statistic.

16. The system of claim 11, wherein the steps are repeated during a packet.

17. The system of claim 11, wherein the instructions are further configured to cause the processor to correct a local oscillator's frequency based on estimated synchronization parameters.

18. The system of claim 11, wherein the instructions are further configured to cause the processor to correct demodulated samples based on estimated synchronization parameters.

19. The system of claim 11, wherein the instructions are further configured to cause the processor to combine signal estimates based on asymmetric observables.

20. The system of claim 11, wherein the instructions are further configured to cause the processor to repeat the steps at all pilot tones used to estimate the carrier and sampling clock frequency.

* * * * *